Nov. 16, 1943.   H. R. GREENLEE   2,334,548
SEALING MEANS
Filed May 5, 1941   2 Sheets-Sheet 2

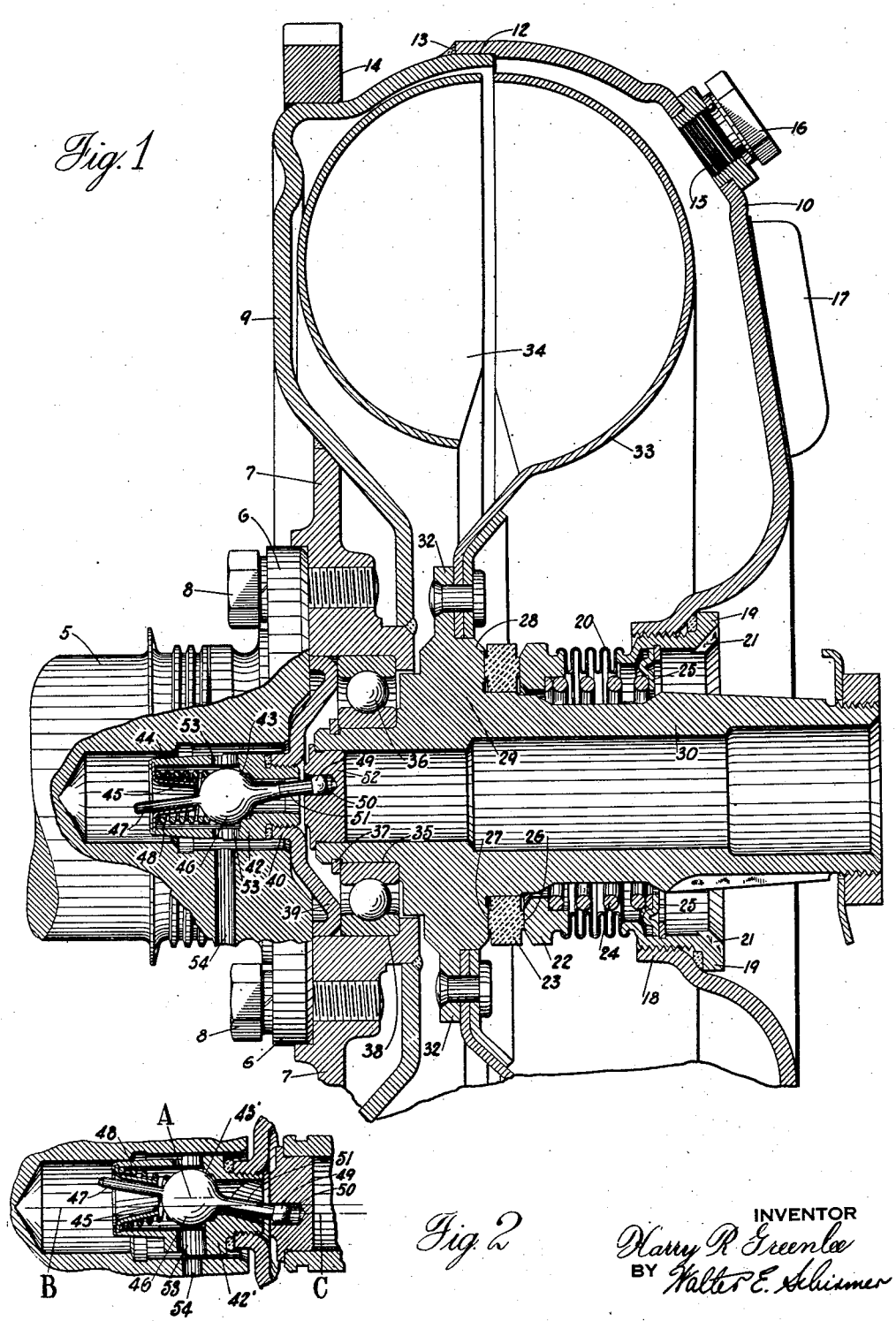

INVENTOR
Harry R. Greenlee
BY Walter E. Schirmer

Patented Nov. 16, 1943

2,334,548

UNITED STATES PATENT OFFICE 2,334,548

SEALING MEANS

Harry R. Greenlee, South Bend, Ind., assignor to The Studebaker Corporation, South Bend, Ind., a corporation of Delaware Application May 5, 1941, Serial No. 392,007

14 Claims. (Cl. 60—54)

This invention relates to sealing means and more particularly is concerned with improvements in connection with the maintaining of the seating surfaces of valves, seals and the like, free and clean of foreign materials.

Valves and sealing members, under certain conditions, are exposed to the deleterious action of material which tends to form coatings or build up surfaces on the valve members preventing the valves from returning to their true seat when they have been operated. The same is true in connection with the friction type of sealing means in which the seal is maintained by pressure between two coacting sealing surfaces. The entrance of any foreign particles onto such surfaces results either in damaging of the surfaces or the destruction of surface contact therebetween, thereby rendering the sealing ineffective.

It is a primary object of the present invention to provide means for both oscillating and/or reciprocating the sealing member relative to its seat in such manner as to prevent the accumulation of foreign particles between the sealing surfaces and to produce a true seating of the valve whenever it moves towards closed position.

In this connection the invention has particular utility in connection with fluid couplings used in automotive or other types of torque transmissions although it is to be understood that the particular features of the invention are not limited to such a transmission device but may equally well be employed in any case where positive sealing contact of two coacting surfaces is desired.

The present invention contemplates broadly the provision of means comprising an eccentric arrangement between two relatively rotating members whereby the valve or sealing member may be oscillated or moved in such manner that relative surface movement of the two sealing surfaces is produced, thereby preventing the building up of any deposit on the sealing surfaces which might tend to bond the two members together or might produce interference preventing accurate sealing therebetween and rendering the seal ineffective. While the invention is disclosed and described in connection with sealing means for a fluid coupling of an automotive transmission, it is to be understood that this is by way of illustration only and in no case limits the underlying principles embodied in the present construction.

Other objects and advantages of the present invention will appear more fully from the following detailed description which taken in conjunction with the accompanying drawings will disclose to those skilled in the art the particular construction and operation of a preferred form of the present invention.

In the drawings:

Figure 1 is a vertical sectional view through a fluid coupling embodying the present invention;

Figure 2 is a detailed sectional view of a modification of the construction disclosed in Figure 1;

Figures 3, 4:
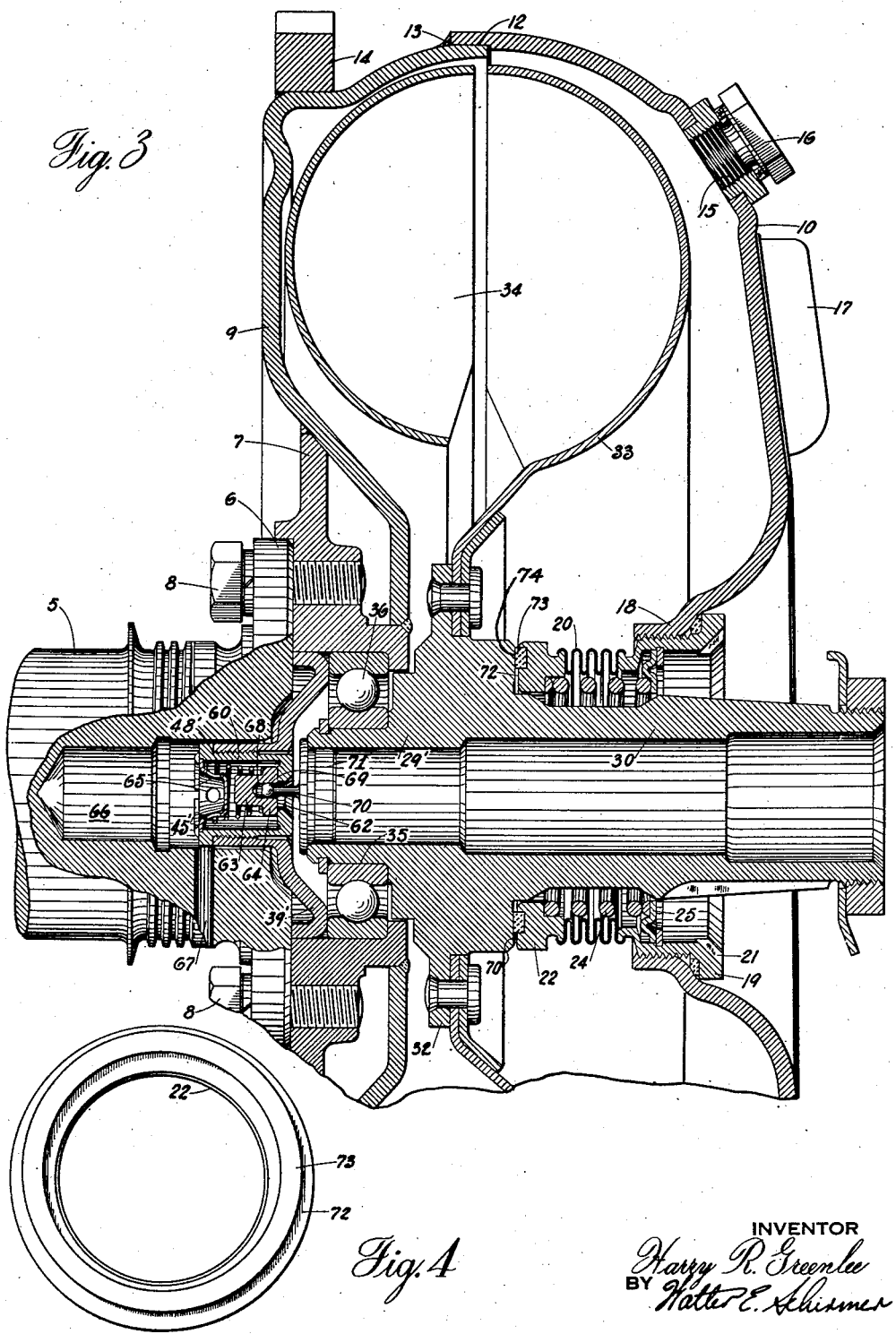
Figure 3 is a view corresponding to Figure 1, showing the invention embodied with a different type of sealing means.
Figure 4 is an end elevational view of the sealing member shown in Figure 3.

Referring now in detail to the invention as disclosed in Figures 1 and 2, there is provided an engine crank shaft 5 leading from the prime mover or other source of power and having a flange 6 to which is secured the fluid coupling housing 7 by means of studs 8. The housing 7, which may be formed of stampings, has the enclosed portion thereof formed of two pieces 9 and 10. The concave shell 9 has its peripheral edge overlapped with the peripheral edge of the shell 10 as indicated at 12, and the two shells are then sealed together by welding, indicated at 13. A suitable starter gear 14 is secured on the stamping 9 for cranking the engine.

The shell 10 is provided with a port 15 adapted to be closed by the plug 16 and is also provided on its outer radial surface with a plurality of radial vanes or fins 17 which provide for cooling the housing, the vanes producing a fan action for moving air over the surface of the housing.

The inner portion of the member 10 is provided with a cylindrical hub like extension 18 which is threaded to receive a suitable bushing member 19, this member carrying at its inner end one end of a flexible metal bellows 20. The bushing 19 has a discharge port 21 leading from the interior of the bushing.

The opposite end of the bellows 20 is sealed to an annular ring member 22 which is axially biased against a sealing ring 23 by means of a helical spring 24 biased at one end against the member 22 and at the opposite end against the spring retainer 25 disposed within the hub portion of the bushing 19. The ring 23 may be formed of carbon or a similar soft material which provides for self-lubrication and preferably is provided with axially projecting ribs 26 and 27. These ribs are annular in form and engage the radial surface of the member 22 and also the radial surface 28 of the hub portion 29 of a tubular sleeve 30. This forms a seal preventing discharge of fluid from the coupling into the interior of the bellows, although in some installations the bellows is employed as a valve for relieving pressure in the coupling out past the surface 28.

This sleeve is provided with a radially directed flange 32 to which is rigidly secured the rotor member 33 of the fluid coupling. The impeller for the coupling is indicated at 34 and is preferably arranged for conjoint rotation with the shaft 5 and may be formed integrally with the stamping 9, if so desired.

It will be apparent that the bellows 20 and the ring 22 rotate conjointly with the shaft 5 and consequently have relative rotation with respect to the ring 23 and the sleeve 30. The sleeve 30 is provided with a bearing receiving surface 35 adapted to receive the inner race of a ball bearing assembly 36, this race being locked in position by means of a snap ring 37. The outer race of the bearing assembly 36 is received within the bearing portion 38 of the housing member 7 and is held in position by means of a retaining cup-like member 39 bearing against the end of the shaft 5 and against the outer race of the bearing assembly and at its inner end being provided with a threaded hub portion 40 receiving the bushing 42 which is suitably bored to provide a valve seat 43.

The bushing 42 is provided with a cylindrical extension 44 which at its end receives the cone shaped stop 45 and encloses a ball check member indicated generally at 46. The ball check member 46, however, instead of being formed in the usual manner as a simple ball, is provided with diametrically oppositely extending portions, the quill portion 47 being received within the stop 45 and being solely for the purpose of inserting the valve member 46 in position. A suitable spring 48 normally holds the spherical surface of the member 46 against the valve seat 43.

The opposite portion of the member 46 is provided with the stud extension 51 which at its end terminates in a ball portion 49 received within the axially directed cylindrical recess 50 in the bushing 52. This bushing is pressed into the end of the sleeve 30 and is held rigidly therein by a press fit. It will be noted that the recess 50 is eccentrically disposed with respect to the centers of rotation of the shaft 5 and of the sleeve 30. Consequently, rotation of the shaft 5 results in the ball portion of the member 46 being oscillated and rocked relative to the valve seating surface 43 of the bushing 42 whereby any relative rotation between the sleeve 30 and the shaft 5 produces a wiping and cleaning action of the ball surface relative to the seat.

This arrangement prevents any carbon or foreign matter in the oil used in the fluid coupling from being deposited upon the seat of the valve, or building up to an extent such that when the valve is operated it cannot reseat itself perfectly. The oscillating and wiping action produced prevents any such action and insures that the valve will at all times reseat itself positively under pressure of the spring 48.

This valve functions as a safety release to relieve undue pressure within the coupling, which may be produced by the heat developed therein. The valve may be set to relieve this pressure at any predetermined point as, for example, 50 pounds, at which time the valve is forced away from the seat 43 and allows the pressure to escape from the coupling through the ports 53 formed in the bushing 42 and thence through the radial passageway 54 drilled in the crank shaft 5. The oil thus forced past the valve then drains back into the crank case of the vehicle and upon reduction of the pressure within the coupling below this point the spring 48 reseats the valve in position. However, by reason of the eccentric relation between the ball portion 49 of the valve and the surface of the valve seat 43, the relative rotation between the shaft 5 and the sleeve 30 will at all times produce this rocking action, since the shaft and sleeve assume synchronous speeds only under certain conditions and then maintain such synchronous speeds only for an instant. Consequently, it may be said that there is always sufficient relative rotation between these elements to produce the oscillating and wiping action required in order to maintain the sealing surface of the valve and the seat free from foreign materials.

In Figure 2 I have provided a modification of the construction shown in Figure 1, the member 46 in Figure 2 being modified to the extent that its center, as indicated at A, is eccentrically disposed with respect to the center of rotation of the shaft 5 as indicated at B. Further, the center of the recess 50 which receives the ball end 49 of the stem 51 is also offset from the center of rotation B of the sleeve and surface as indicated at C. This requires that the bushing 42' and the valve seat 43' be formed eccentrically with respect to the axis of the bushing and the stop member 45 and the spring 48 are correspondingly disposed in an offset position. With the use of a double eccentric construction as shown in Figure 2, the rotation of the shaft and sleeve at different speeds will produce an accentuated rocking and oscillating motion of the ball member and will insure a positive wiping action at all times. In the embodiment of the invention shown in Figure 1 the wiping action will be slight when the shaft and the sleeve approach substantially synchronous speeds, but it will be observed that in the embodiment of Figure 2 the double eccentric construction will provide the maximum wiping action attainable when the shaft and sleeve approach substantially the same rate of rotation. However, at no time will the shaft and sleeve rotate at the same speed so that in either embodiment of the invention the wiping action will always be taking place. The wiping action of the surfaces of the ball and seat thereby insure accurate sealing action between the members, preventing the escape of oil from the coupling until such time as the valve is opened under a predetermined fluid pressure.

Considering now the form of the invention shown in Figures 3 and 4, this form of the invention is embodied in the same type of fluid coupling previously described and similar reference numerals are employed to indicate corresponding parts. However, in this form of the invention the retaining plate 39' has its center portion axially extended to receive the threaded bushing 60 which is provided with the valve opening or port 62 normally closed by means of the valve member 63.

It will be noted that the valve member has an enlarged face portion 64 which seats against the inner radial face defining the valve opening 62 and is normally held thereagainst by means of the spring 48' retained about the spring seat 45'. The spring seat 45' is provided with ports 65 whereby upon opening of the valve 63 by axial motion away from the seat, fluid from the coupling passes through the retainer 45' into the recess 66 formed in the shaft 5, and thence through the radially directed port 67 to the crank case of the transmission sump of the vehicle.

The valve member 63 is provided with an axial recess 68 adapted to receive the ball end 69 of a stem 70 carried by a bushing 71 fitted into the axial ball of the hub member 29' of the coupling. The stem 70 is disposed eccentrically with respect to the axis of rotation of the sleeve 30 and the shaft 5 whereby any relative rotation between the sleeve 30 and the shaft 5 results in the valve member 63 being shifted laterally against the surface of the valve opening 62 on the radial face of the bushing 60. This prevents the accumulation of any foreign material on the surface, maintaining positive seating engagement of the valve member against the surface and thereby insuring positive closing of the opening 62 except under such pressure conditions as force the valve member 63 axially to the left against the spring 48'.

In this same form of the invention the sealing means between the flange 29' of the sleeve 30 and the housing is modified in that the flange or hub 29' is provided with a bearing surface 74 corresponding somewhat to the surface 28 shown in Figure 1. The bellows member 20 which acts as a resilient seal has secured to the inner end thereof the ring 22 which in this form of the invention is provided with an eccentrically disposed axially directed recess in the face 72 thereof. Disposed in this eccentric recess in any suitable manner is a graphite or similar self-lubricating ring 73 suitably held within the recess, the ring 73 thereby being disposed eccentrically with respect to the axis of the sleeve 30 as indicated more clearly in Figure 4.

It will therefore be apparent that as the sleeve 30 rotates with respect to the ring 32 the eccentric of the sealing ring 73 maintains the surface 74 free from foreign materials, as a uniform wiping action over the entire radial area of this surface is produced by the eccentric disposition of the sealing ring 73. As a result, no foreign materials can become disposed upon the surface 74 which might tend to cock the ring 73 or to score the surface. The pressure of the spring 24 thereby is maintained uniformly over the sealing surface, holding the ring 73 in sealing engagement therewith and thus providing a sealing arrangement which is maintained free of foreign particles or the building up of any foreign material which might disturb the sealing action. It will thus be seen that with this form of the invention sealing means are provided, comprising the valve 63 and the sealing ring 73, both arranged eccentrically with respect to the axis of rotation of the parts to which they are connected so that the surfaces to be sealed are continually subjected to a radial wiping action, preventing the building up of any foreign deposits on such surfaces that might interfere with the maintenance of a positive seal. This radial wiping action is produced at all times except for such rare instances as when the two surfaces are rotated in synchronism which, however, occurs only for an instant during certain periods of operation. As a result it may be said that a continuous relative radial movement is provided between the sealing surfaces to maintain the same in true wiping engagement to provide effective sealing action therebetween.

I am aware that various changes may be made in certain details of the present construction and I therefore do not intend to be limited to the exact embodiments herein shown and described but only in so far as defined by the scope and spirit of the appended claims.

I claim:

1. In combination, a first rotatable member having an axially directed bore, a bushing carried in said bore and having a valve port defined by a valve seat, a valve member in said bushing normally urged against said seat to close said port, a second rotatable member in axial alinement with said first member, and eccentrically located means carried by the second of said rotatable members and having a connection to said valve member for producing wiping action between said valve member and valve seat upon relative rotation of said rotatable members.

2. In combination, a first rotatable member having an axial bore, a bushing carried in said bore and having a valve port therein, a radial surface defining a valve seat about said port, a valve member in said bushing having a surface seating on said valve seat surface and normally urged into engagement therewith, a second rotatable member, an eccentrically located pin extending axially from said second member and a recess in said valve member receiving the end of said pin whereby relative rotation between said rotatable members produces radial wiping action between said surfaces.

3. The combination of claim 2 wherein said pin extends through said port into engagement with said valve member.

4. In combination, a pair of axially alined relatively rotatable members, an axial recess in the end of one of said members, a ball check valve disposed in said recess and including a ball valve member normally urged to valve closing position and having a stem projecting toward the other rotatable member, and an eccentrically disposed recess in the end face of said other member receiving the end of said stem for producing rocking oscillation of said ball member on its seat during relative rotation of said members.

5. The combination of claim 4 wherein the axis of said ball member is eccentrically located relative to the axis of rotation of said one rotatable member to produce said rocking oscillation upon any rotation of said rotatable members.

6. In combination, a pair of axially alined rotatable members having their adjacent ends in proximity, a recess in one of said members, a fluid bypass port located in said recess, a check valve normally urged into position to close said port and having seating surface engagement about the defining surface of said port, and eccentrically arranged means interconnecting said valve to the adjacent end of the other rotatable member for producing a wiping action of said valve member on said seating surface.

7. In combination, a pair of axially alined rotatable members, a valve in the end of one of said members including a transversely arranged valve port and a valve member normally urged into seating engagement about said port to close the same, and means extending between said valve member and a point located off center on the other of said rotatable members for producing a wiping action of said valve member on its seat during relative rotation of said members.

8. In combination, a first rotatable shaft having a tubular hub portion, a bushing disposed in said hub portion having a transverse port, a radial seating surface defining one face of said port, a valve member in said bushing having a radial face normally urged against said surface to close said port, an axial recess in the face of said valve member, and an axial pin projecting from said other rotatable member through said port and engaging in said recess, said pin being offset from the axis of rotation of said members whereby relative rotation therebetween produces radial wiping action between said valve member face and said seating surface.

9. In a fluid coupling including a coaxial intermediate sleeve carrying the rotor of the coupling, and a coaxial shaft for driving the impeller of the coupling, means for relieving the fluid pressure in the coupling above a predetermined point comprising a valve carried in the coupling end of said shaft including a valve seat and a valve member normally held under predetermined pressure on said seat, and means comprising an eccentrically arranged connection between said valve member and said sleeve for oscillating said valve member on said seat to produce wiping action therebetween during relative rotation of said shaft and sleeve.

10. In a hydraulic torque transmitting device, a pair of relatively rotatable members one of which includes a housing in which an end of the other member is received, and a pressure relief valve comprising a valve seat carried by said one member, a valve element seated on said seat, and a connection between said valve element and said end of the other member, adapted to effect wiping movement of said valve element on said seat.

11. In a hydraulic torque transmitting device, a driving assembly including a housing and an impeller therein, a driven assembly including a runner and a shaft extending into said housing and through said runner and piloted at its end in said driving assembly, and a pressure relief valve comprising a valve seat carried by the driving assembly adjacent said piloted end of the shaft, a valve element seated on said seat, and a connection between said valve element and said piloted end of the shaft, adapted to effect a wiping movement of said valve element on said seat.

12. In a hydraulic torque transmitting device, a driving assembly including a hub portion providing an axially opening recess and a housing carried by said hub portion, a driven member relatively rotatable with respect to said driving assembly and including a shaft extending into said housing, a bearing in which the end of said shaft is piloted in said recess, a sealing device interposed between said housing and said shaft and forming therewith a normally closed fluid chamber, and a valve for relieving pressure in said chamber, comprising a valve seat carried by said hub portion, a valve element seated on said seat, and a connection between said valve element and said shaft end, adapted to effect wiping movement of said valve element on said seat, said valve discharging into said recess and said recess being vented.

13. A hydraulic torque transmitting device as defined in claim 10, wherein said valve further comprises a tubular valve body detachably mounted in said one member exteriorly of the housing and in communication with the interior thereof, and wherein said connection comprises an elongated driving element extending through said body, connected at one end to the valve element, and detachably connected at its other end to said shaft.

14. A hydraulic torque transmitting device as defined in claim 12, including a wall separating the vented region of said recess from a portion of said recess forming part of said chamber and receiving said bearing, said valve further including a tubular valve body mounted in said wall, with said seat disposed within said vented region of the recess and the other extremity of the body communicating with said chamber, said connection comprising an elongated driving element extending through said valve body, coupled at one end to the valve element and at its other end with said shaft end.

HARRY R. GREENLEE.